United States Patent [19]

Peterson

[11] Patent Number: 4,964,370
[45] Date of Patent: Oct. 23, 1990

[54] LEASH RETRACTOR

[76] Inventor: Edwin R. Peterson, 4420 Hillcrest, Boise, Id. 83705

[21] Appl. No.: 386,945

[22] Filed: Jul. 31, 1989

[51] Int. Cl.⁵ .............................................. A01K 27/00
[52] U.S. Cl. .................................... 119/109; 119/106; 242/107
[58] Field of Search ................ 119/106, 109; 242/107, 242/107.2, 107.6, 107.7

[56] References Cited

U.S. PATENT DOCUMENTS

| | | | |
|---|---|---|---|
| D. 124,073 | 12/1940 | Gottlieb | 119/109 |
| 2,172,043 | 9/1939 | Wole | 242/107.6 |
| 4,159,809 | 7/1979 | Rawson | 242/107 |
| 4,328,766 | 5/1982 | Deibert | 119/109 |
| 4,328,767 | 5/1982 | Peterson | 119/109 |
| 4,501,230 | 2/1985 | Talo | 119/109 |
| 4,733,832 | 3/1988 | Napierski | 242/107.6 |
| 4,809,925 | 3/1989 | Takada | 242/107 |

Primary Examiner—John Weiss

[57] ABSTRACT

Plastic parts have press fit connections requiring no glue or sonic welding. In addition to animal collars the retractor mechanism is used in different types of housings for other purposes such as child restraint or pulling a suitcase on wheels. For use with an animal collar the housing has a leash outlet tunnel and a parallel collar strap tunnel, and may have a transverse clip tunnel to receive a clip for detachably mounting the retractor mechanism on the collar.

15 Claims, 5 Drawing Sheets

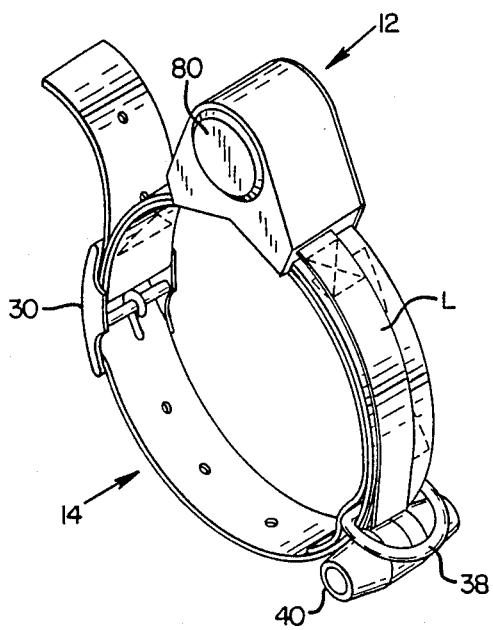
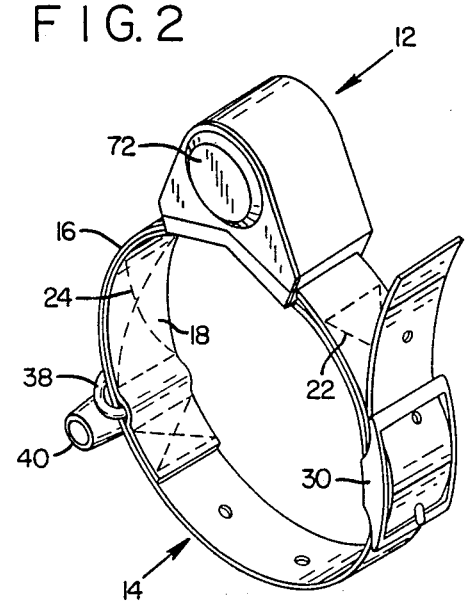
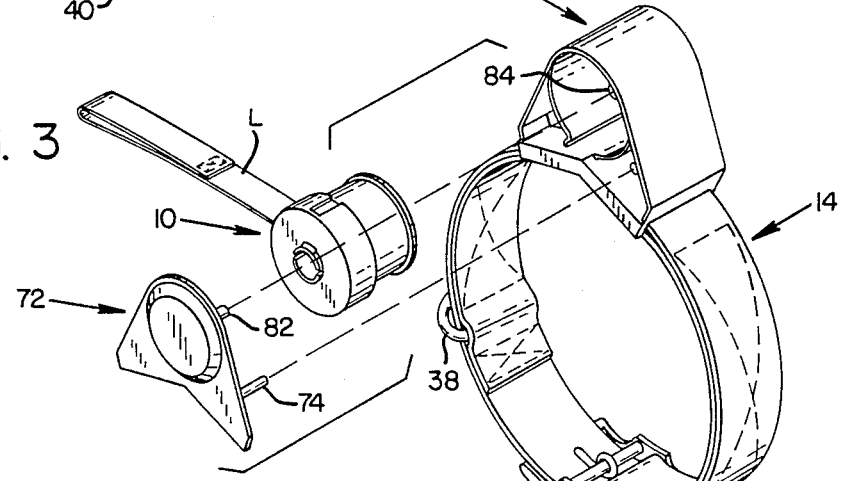
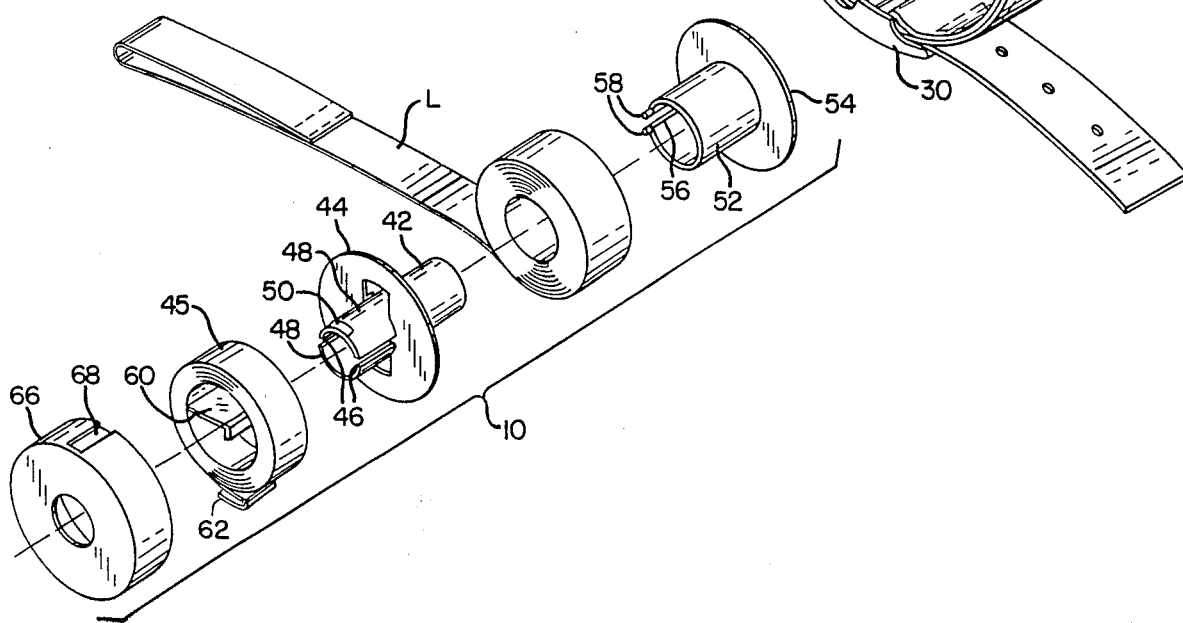

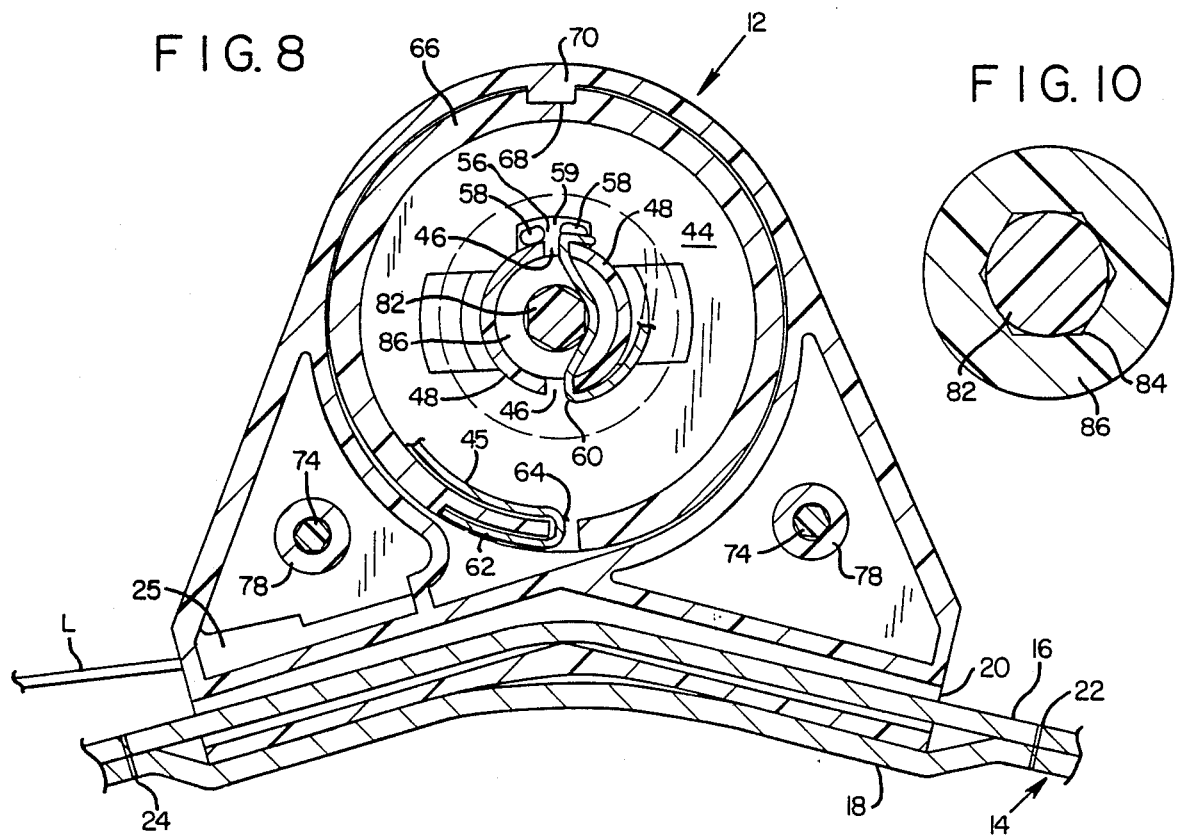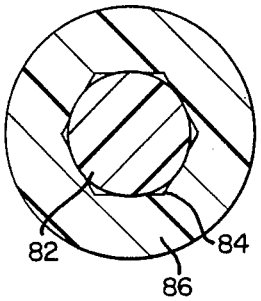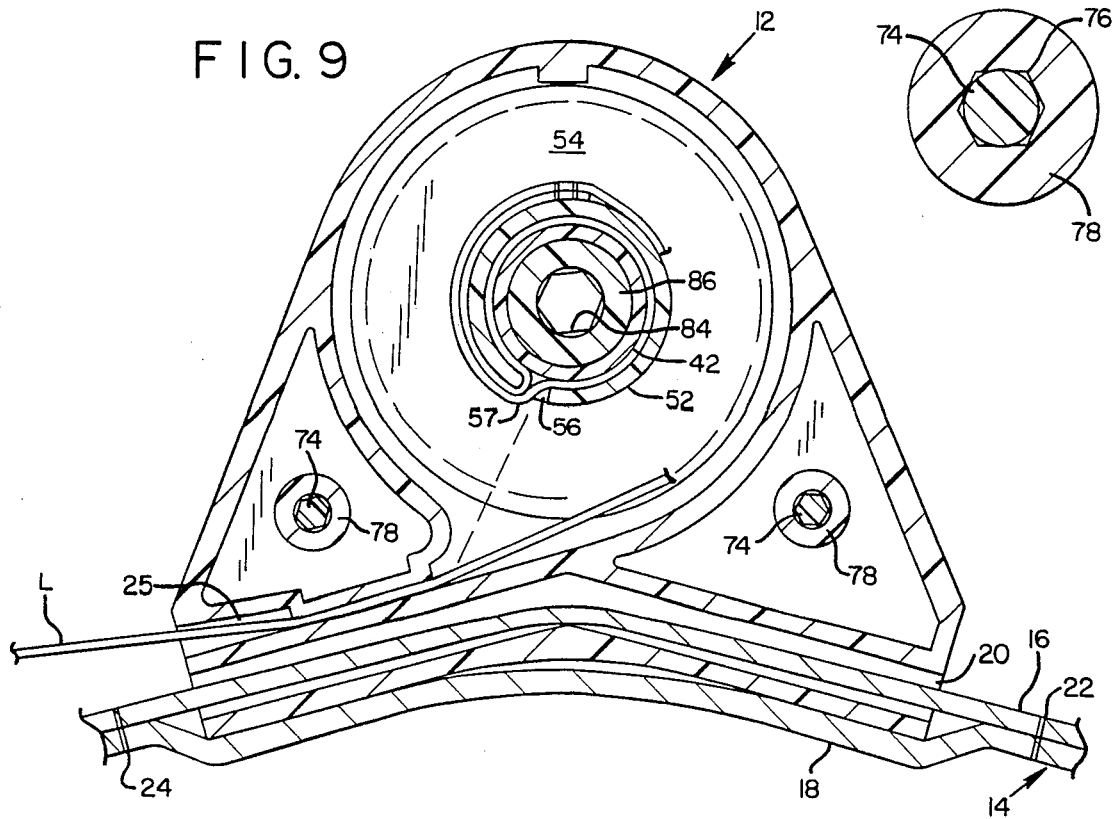

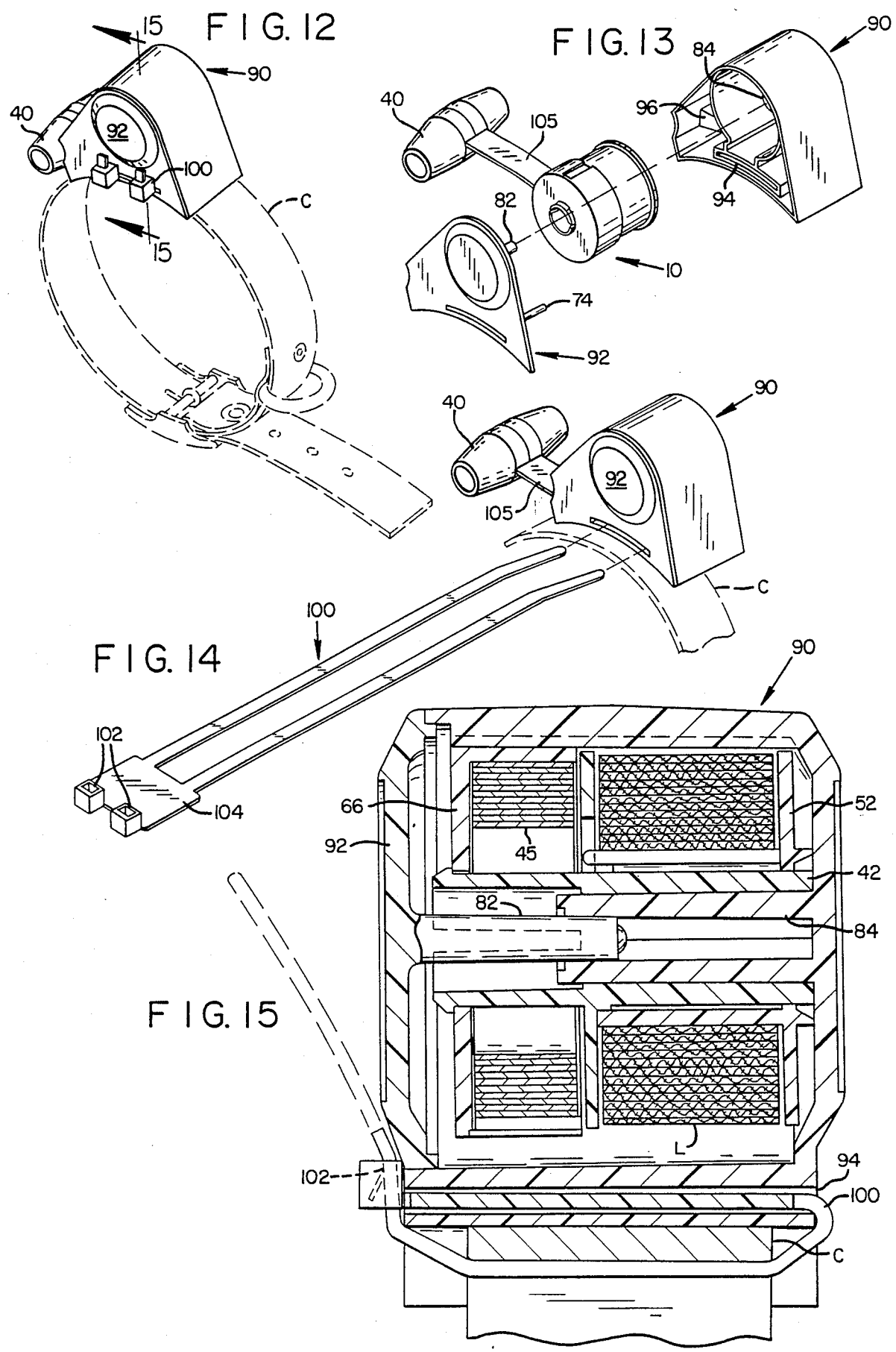

LEASH RETRACTOR

BACKGROUND OF THE INVENTION

This invention relates to a retractor for a leash with various applications dealing with movable objects to be restrained or pulled, such as animals, children and/or luggage.

The present mechanism involves certain improvements and modifications of the retractor disclosed in my prior U.S. Pat. No. 4,328,767. That retractor was incorporated in an animal collar making the unit rather complicated and expensive to manufacture, as well as being limited in its fields of use. It could not be applied by the user to a conventional collar or used for other purposes not involving an animal. For example, a leash is frequently used to pull a heavy suitcase on wheels, or to restrain a child.

In said prior retractor various parts were secured together either by glue or sonic welding.

SUMMARY OF THE INVENTION

In the present form of construction the plastic parts have press fit connections requiring no glue or sonic welding. This materially reduces the time and cost of assembly.

The retractor mechanism is contained in a sub-assembly which may be used in various types of housings for permanent incorporation as a complete leash retractor unit.

One form of housing is permanently affixed to a collar by the manufacturer, one form is for an add on retractor and a third form is for hand hold use. The sub-assembly contains a main spool, a leash spool, a retractor spring and a spring retainer, the sub-assembly being retained in the housing by a press fit cover.

Thus the present retractor is not only less expensive to manufacture but also has a much wider field of use.

The invention will be better understood and the foregoing features and advantages will become apparent from the following description of the preferred embodiments illustrated in the accompanying drawings. Various changes may be made in details of construction and certain features may be used without others. All such modifications within the scope of the appended claims are included in the invention.

BRIEF DESCRIPTION OF THE DRAWINGS

FIG. 1 is a front perspective view of the retractor permanently mounted on an animal collar.

FIG. 2 is a rear perspective view.

FIG. 3 is an exploded view of the parts in FIG. 2.

FIG. 4 is an exploded view of the retractor subassembly in FIG. 3.

FIG. 8 is a view on the lines 8—8 in FIG. 7.

FIG. 9 is a view on the line 9—9 in FIG. 7.

FIG. 10 is an enlarged sectional view of the studs 82 and 86 in FIGS. 8 and 9.

FIG. 11 is an enlarged sectional view of the studs 74 and 78 in FIGS. 8 and 9.

FIG. 12 is a rear perspective view of a secong form of the device as applied by the user to a conventional animal collar.

FIG. 13 is an exploded view of the FIG. 12.

FIG. 14 is a perspective view showing how the retractor is mounted on a conventional collar.

FIG. 15 is an enlarged sectional view approximately on the line 15—15 of FIG. 12.

DESCRIPTION OF THE PREFERRED EMBODIMENTS

Figure 16:
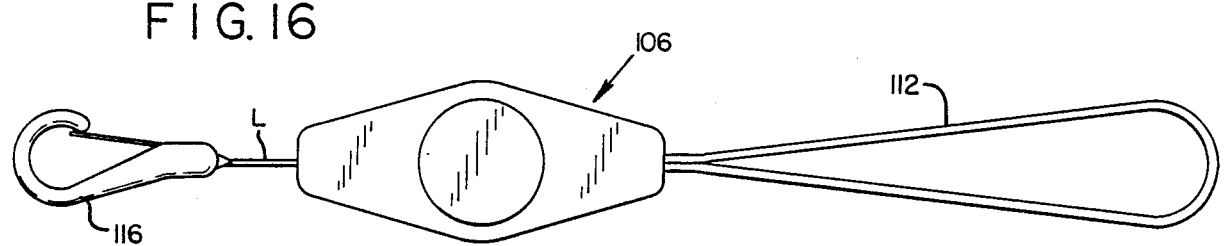
FIG. 16 is a side elevational view of a hand held retractor.
Figure 17:
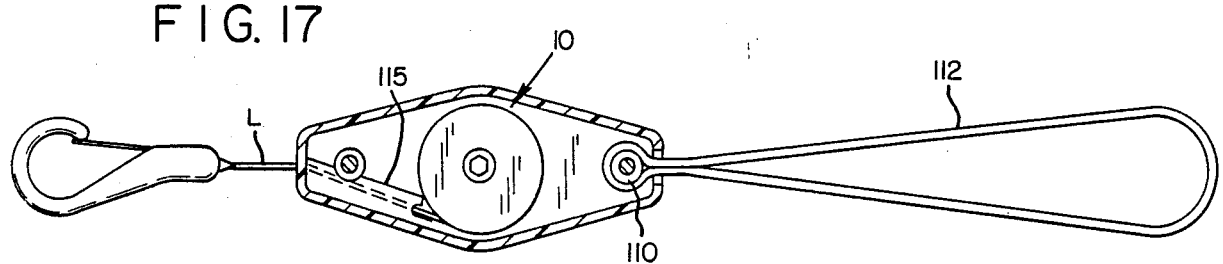
FIG. 17 is a view corresponding to FIG. 16 with parts in section.
Figure 18:
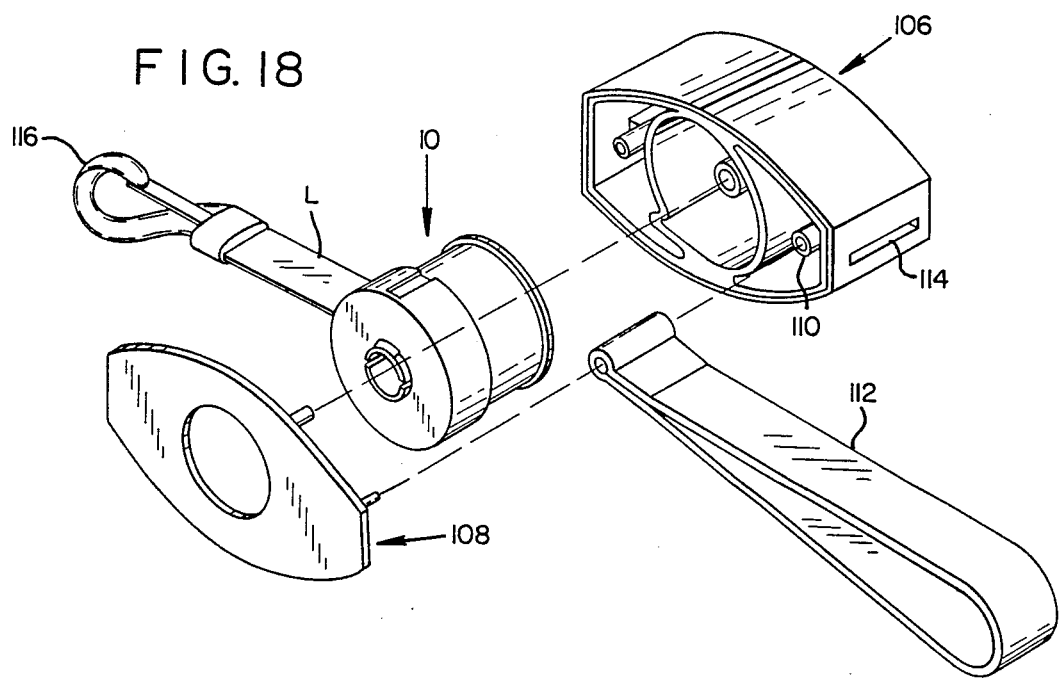
FIG. 18 is an exploded view of the retractor in FIGS. 16 and 17.

The retractor subassembly 10 in FIG. 3 may be used in any one of several different housings for various types of use. FIGS. 1 to 11 show a leash retractor incorporated in an animal collar by the manufacturer as a permanent part thereof. FIGS. 12 to 15 show the subassembly 10 in a housing adapted for attachment by the user as an add on device on a conventional collar. FIGS. 16 to 18 show the retractor subassembly 10 in a housing adapted for use as a hand held retractor for a leash to be connected with movable objects to be restrained or pulled, such as animals, children and/or luggage.

Thus, in FIGS. 1, 2 and 3 the housing 12 is permanently affixed to the collar 14. As seen in FIGS. 8 and 9 the collar 14 has an outside thickness of material 16 and an underlying thickness of material 18. The outside thickness of material 16 passes through an enclosed tunnel 20 in housing 12 while the underlying thickness 18 extends under the outside surface of the housing adjacent the tunnel 20. The two thicknesses of material 16 and 18 are secured together at opposite ends of the tunnel by stitching 22 and 24 to hold housing 12 in a fixed position on the collar.

Collar tunnel 20 is adjacent and parallel with the leash outlet tunnel 25 in FIGS. 8 and 9.

Figure 5:
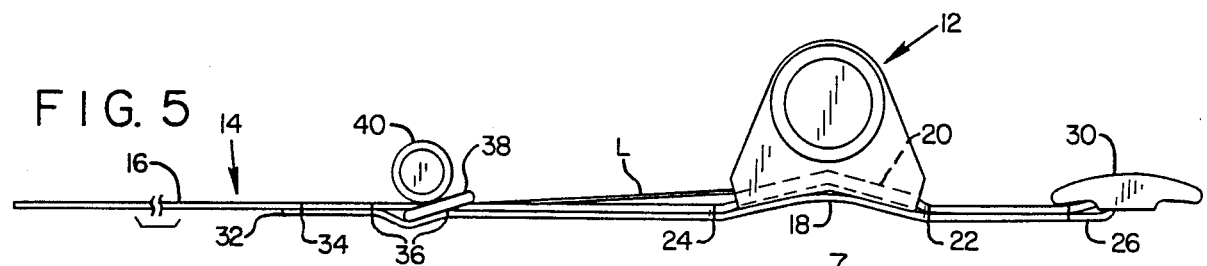
FIG. 5 is a side elevation view of the complete assembly in FIGS. 1 and 2.
Figure 6:
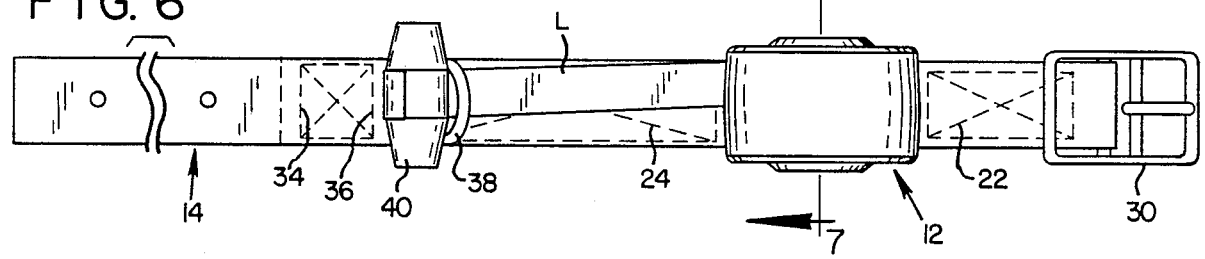
FIG. 6 is a top plan view.

The main extent of the collar material around the circular collar has a single thickness, the double thickness just described being formed by doubling back one end of the single thickness to form a loop 26 for attachment to one end of the buckle 30 in FIG. 5. In use, the single thickness 16 of the collar material is looped around the animal's neck and the free end connected to the opposite end of this buckle. The loop 26 provides the underlying thickness of material 18 which has its end at 32 secured by stitching 34 to the material thickness 16. Other similar stitching at 36 secures the handle stop D-ring 38 for the handle 40 on leash L.

As seen in FIG. 4 the retractor subassembly 10 has a main spool 42 with a radial circular plate 44 at midlength. The leash L is encircles the spool on one side of plate 44 and a retractor spring 45 encircles the spool on the opposite side of plate 44. The end of the spool within spring 45 is longitudinally slotted at 46 in its opposite sides to form two confronting semi-cylindrical portions 48, each having a hook 50 at the adjacent end of the spool, only the top side hook 50 appearing in FIG. 4.

Leash spool 52 has a circular flange 54 at one end. A slot 56 extends the length of this spool and a pair of lugs 58 project axially from the spool on opposite sides of this slot and engage in a hole 59 in plate 44 to prevent independent rotation of the leash spool, as seen in FIG. 8. The inner end of leash L has a loop 57 which extends through the slot 56 and encircles main spool 42 to be anchored to the spool as seen in FIG. 9.

The inner end 60 of spring 445 is anchored in the slots 46 as seen in FIG. 8. The outer end 62 is anchored in a slot 64 in spring retainer 66 (FIG. 8). Rotation of the spring retainer is prevented by a groove 68 which receives a projection 70 on the inside of housing 12.

Figure 7:
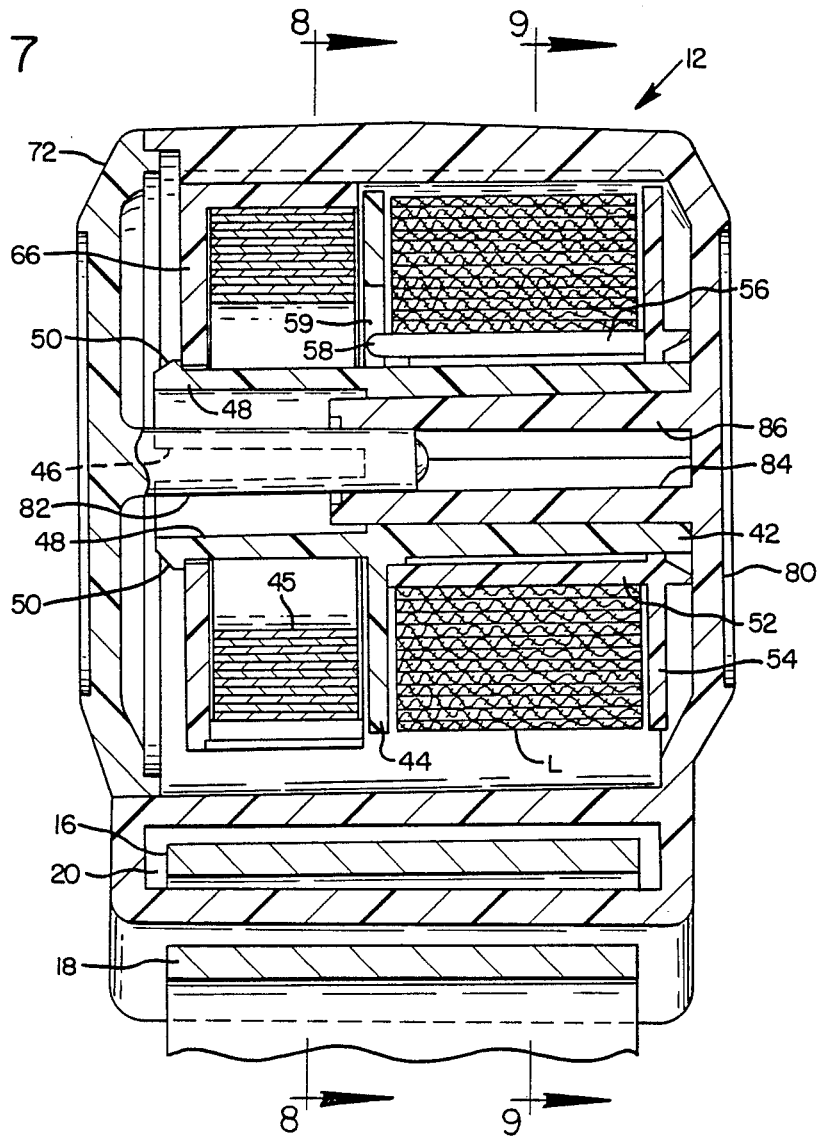
FIG. 7 is an enlarged sectional view on the line 7—7 in FIG. 6.

The retractor subassembly 10 is retained in housing 12 by a cover 72 as shown in FIG. 7. Cover 72 has a pair of cylindrical studs 74, each having a press fit in a hexagonal hole 76 in one of a pair of bosses 78 projecting inward from the back wall 80 of housing 12 (see FIGS. 9 and 11). Cover 72 also has a central cylindrical stud 82 which has a press fit connection in a hexagonal hole 84 in a hollow boss 86 projecting inward from back wall 82 (see FIGS. 8 and 10). The resilience of the plastic material of these studs and bosses provides a secure press fit of the parts. Main spool 42 rotates on boss 86.

In FIGS. 12–15 the retractor subassembly 10 is retained in housing 90 by a cover 92 having a press fit stud and boss connection as described in connection with FIG. 3. In this embodiment the housing 90 has a tunnel 94 transverse to the leash outlet tunnel 96 to receive a two leg collar clip 100. The clip is inserted in tunnel 94, bent around the collar C and the two legs inserted in a pair of openings 102 in a head portion 104 of the clip. Then the excess length of the legs 100 may be cut off as shown in broken lines in FIG. 15. The loop 105 on the end of the leash in FIGS. 13 and 14 is connected to the handle 40 as shown in FIG. 12.

This is an add-on retractor which may be attached to a conventional dog collar by the user of the leash.

FIG. 16–18 show the retractor subassembly 10 with a hand-held leash. Retractor subassembly 10 is retained in housing 106 by cover 108 which has a press fit stud and boss connection with the housing as described in connection with FIGS. 8–11.

The hollow boss 110 is connected to a wrist loop 112 extending through an opening 114 in one end of the housing to receive the hand of the user. The leash L extends out of an outlet tunnel 115 in the opposite end of the housing and is equipped with a hook 116 or other connecting device for a dog collar, child harness or clothing, suitcase as well as any other object to be restrained or pulled.

What is claimed is:

1. A leash retractor comprising a housing, a retractor sub-assembly retained in said housing by a cover having a press fit connection with said housing, a main spool in said housing, a leash spool having a press fit connection with said main spool, a coil spring on said main spool, and a spring retainer having a press fit and lock connection with said main spool.

2. A leash retractor as defined in claim 1, said press fit connection of said cover on said housing comprising hollow bosses in said housing, each having a hexogonal bore, and cylindrical studs on said cover insertable with press fit engagement in said bores.

3. A leash retractor as defined in claim 2, said main spool being mounted for rotation on one of said hollow bosses.

4. A leash retractor as defined in claim 1, said press fit and lock connection of said spring retainer on said main spool comprising an opening in said spring retainer to receive a hub on said main spool, and resilient teeth on said hub insertable through said opening and exerting locking engagement behind said retainer at the margin of said opening.

5. A leash retractor as defined in claim 4, said hub on said main spool comprising a hollow cylinder having a pair of longitudinal slots in its opposite sides, said teeth being on the end of said hub between said slots with the hub portions between said slots providing resilient supports for said teeth.

6. A leash retractor as defined in claim 1 including a radial plate on said main spool, and axial projections on the hub of said leash spool engaging in an opening in said plate to prevent independent rotation of said leash spool.

7. A leash retractor as defined in claim 1 including a cylindrical flange on said spring retainer fitting within said housing, and an axial groove in said flange engaged by a projection in said housing to prevent rotation of said spring retainer.

8. A leash retractor as defined in claim 1 including an enclosed leash outlet tunnel in said housing for said leash.

9. A leash retractor as defined in claim 8 including an enclosed collar tunnel in said housing adjacent and parallel to said leash outlet tunnel to receive a length of collar strap of an animal collar for mounting the retractor on said collar.

10. The invention defined in claim 9, said collar having a single thickness of said strap in said collar tunnel and a second thickness of strap outside of said collar tunnel, said second thickness being secured outside opposite ends of said collar tunnel to said strap in said tunnel.

11. The invention as defined in claim 10, one end of said strap being doubled back to form a loop for attachment to a collar buckle, said one end being secured to another portion of the strap at the location of a handle stop D-ring on the collar with the doubled back portion being said second thickness of strap outside said collar tunnel.

12. A leash retractor as defined in claim 8 including an enclosed clip tunnel in said housing transverse to said leash tunnel to receive a clip for mounting the retractor on an animal collar.

13. A leash retractor as defined in claim 12, said clip having a head portion with two apertures and two parallel leg portions insertable through said clip tunnel and bendable around the collar strap and insertable in said apertures.

14. A leash retractor as defined in claim 8, said housing being elongated in the direction of said leash outlet tunnel with said outlet tunnel at one end of the housing, and a wrist loop connected to the opposite end of the housing.

15. A leash retractor for an animal collar comprising a housing assembly having a housing containing a spring activated leash spool for reeling in said leash, an enclosed collar tunnel in one side of said housing to receive a length of collar strap of said animal collar for mounting said housing assembly on the collar, and an enclosed leash outlet tunnel in said housing adjacent and parallel to said collar tunnel, said housing containing said collar tunnel and leash tunnel, a retractor sub-assembly containing said leash spool and a cover on said housing retaining said retractor sub-assembly in said housing, said retractor sub-assembly comprising a main spool, a leash on said leash spool, a ribbon type steel coil spring on said main spool, and a spring retainer on said main spool, said leash spool being mounted on said main spool, said spring retainer having a press fit and lock connection to said main spool, and said cover having a press fit connection to said housing.

* * * * *